United States Patent [19]

Gold

[11] Patent Number: 4,850,640

[45] Date of Patent: Jul. 25, 1989

[54] AUTO WINDOW MOULDING

[76] Inventor: Peter N. Gold, 465 N. Wood Rd., Rockville Centre, N.Y. 11570

[21] Appl. No.: 220,081

[22] Filed: Jul. 18, 1988

[51] Int. Cl.$^4$ ............................................. B62D 27/00
[52] U.S. Cl. ......................................... 296/201; 52/208
[58] Field of Search .................... 296/93, 84.1, 201; 52/208

[56] References Cited

U.S. PATENT DOCUMENTS

| | | | |
|---|---|---|---|
| 4,165,119 | 8/1979 | Hedeen et al. | 296/93 |
| 4,405,174 | 9/1983 | Yamane | 296/93 |
| 4,434,593 | 3/1984 | Horike et al. | 52/208 |
| 4,523,783 | 6/1985 | Yamada | 296/93 |

Primary Examiner—Robert R. Song
Attorney, Agent, or Firm—Myron Amer

[57] ABSTRACT

In a window pane mounting arrangement, there is proposed an improved window moulding which can be neatly fitted to a clearance defined between the edge of the window pane and the peripheral flange of the window opening. The window moulding comprises an elongate band portion adapted to cover the clearance and a leg portion depending from the inboard surface of the band portion and disposed in the clearance. The improvement consists of locating the leg portion closer to the window pane so that the overlying portion of the band which extends from the leg to the window pane is of a nominal extent and thus does not manifest crimping when the moulding is bent through small angles.

1 Claim, 1 Drawing Sheet

U.S. Patent  Jul. 25, 1989  4,850,640
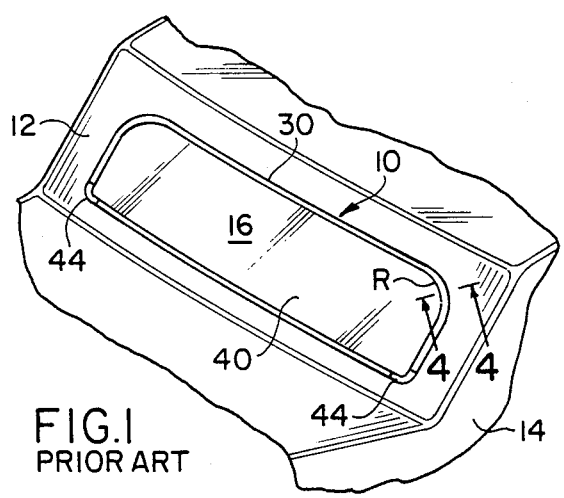
FIG.1
PRIOR ART
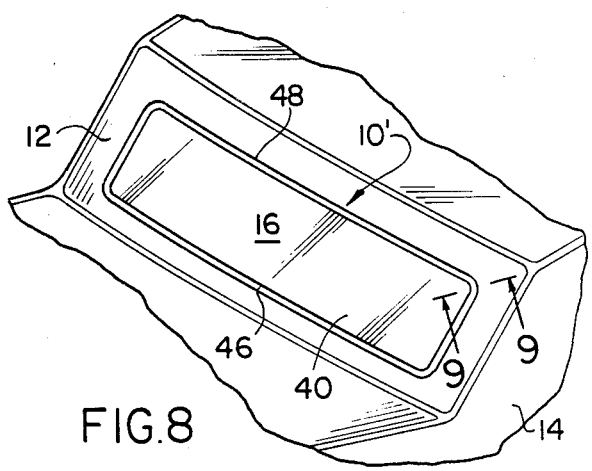
FIG.8
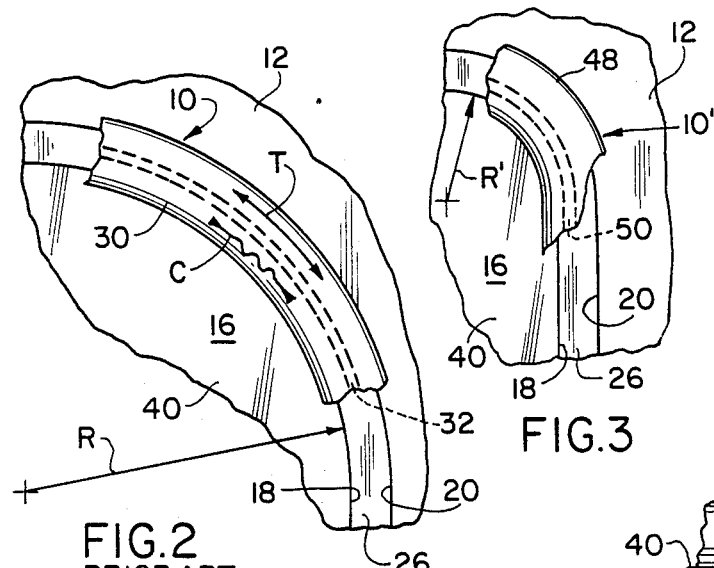
FIG.2
PRIOR ART
FIG.3
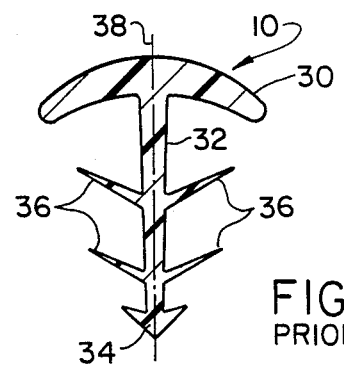
FIG.6
PRIOR ART
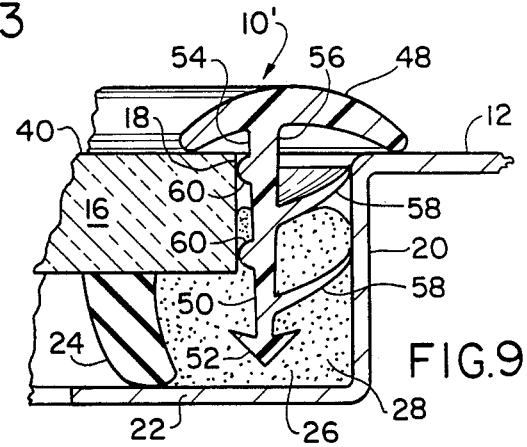
FIG.9
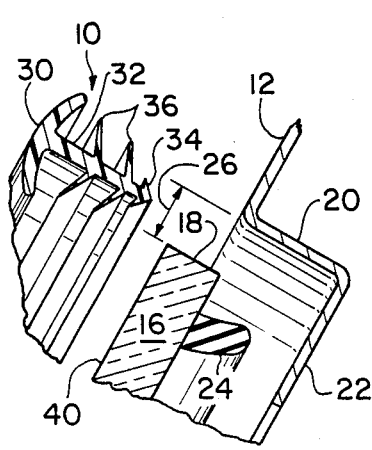
FIG.4
PRIOR ART
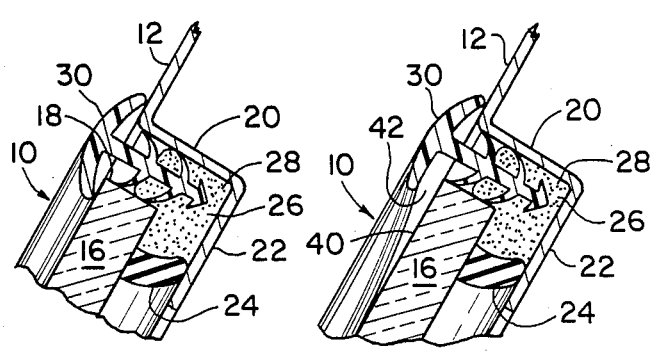
FIG.5
PRIOR ART
FIG.7
PRIOR ART

AUTO WINDOW MOULDING

The present invention relates generally to an auto window moulding, referred to in the trade as a window reveal moulding, and more particularly to a moulding or trim that can be used as one continuous piece, having been cut to size from an extrusion thereof, and fitted about the window without the use of separate corner pieces.

Current practice contemplates the use of an extruded resilient plastic reveal moulding for a vehicle body window installation which has a decorative trim or crown portion adapted to bridge the space between the window glass or pane and the body opening in overlying engagement therewith. The moulding is of the type having a stem extruded integral with the decorative trim portion and extending generally normal therefrom for insertion into the space preparatory to achieving a bond between an adhesive sealant previously placed in the space and the stem. While generally effective for the purposes intended, when the window corners are 90 degrees or approach this sharp angle of changing direction, i.e. are of a small radius turn, the known prior art moulding cannot be used at the corners because they exhibit crumpling or crimping in their inner edge. Thus in these corners, separate corner pieces must be used and the prior art moulding is used in the straight length portions therebetween.

In contrast, the inventive window moulding can be used entirely about the periphery of the window, and specifically can be fitted in small radius corners, and still contribute to a finished, commercially acceptable appearance.

EXAMPLES OF PRIOR ART

U.S. Pat. No. 4,165,119 issued on Aug. 21, 1979 to Hedeen et al., describes a window reveal plastic moulding 50 which, according to accepted practice, has retrorse fins 58–68 on opposite sides of a depending stem 54 to center the top decorative trim portion or crown 52 over the gap between the window glass or pane 24 and window opening 22. This patent is instructive generally on the prior use of reveal moulding and is noted for this reason, but does indicate how reveal moulding can be used effectively in corners approaching 90 degrees.

U.S. Pat. No. 4,523,783 issued on June 18, 1985 to Yamada et al. does address the problem experienced using reveal moulding in a sharply curved corner, and illustrates in FIG. 3 the unsightly crumpling that occurs in the inner edge of the moulding in this circumstance. As a solution, Yamada proposes flexuring of depending legs on the moulding to counter the crumpling tendency.

In the inventive window moulding, crumpling or crimping is obviated in a simplier and effective manner by correspondingly simplifying the cross sectional configuration of the moulding. Rather than adding flexuring legs or otherwise inducing countering forces in the moulding, it is configured with a reduced overhang on the side facing the glass, and rather than striving to center the stem in the gap, it is intentionally shifted adjacent the glass so that the diminished overhang will achieve the bridging function intended. Being reduced in dimension, the referred to overhang can readily be bent in a sharp angle or curvature without exhibiting crumpling or crimping, all as will be explained in greater detail herein.

As will be noted as the description proceeds, structurally the inventive auto window mould hereof is very similar to that of the prior art, but the structural differences that exist, and which will be noted, are quite significant in that they enable the inventive window mould to achieve what the prior art window mould could not achieve. This difference therebetween is, of course, set forth in the description which follows. It also is illustrated in the drawings in which, for comparison, the prior art moulding is illustrated in FIGS. 1, 2, 4, 5, 6 and 7, and the inventive window mould in remaining FIGS. 3, 8 and 9. The drawing comparisons that are particularly instructive as to the differences between the prior art and inventive window moulds are FIGS. 2 and 3, and FIGS. 6 and 9.

Turning now to the drawings:

FIG. 1 is a perspective view of an auto rear view window installed with a known, popular moulding;

FIG. 2 is a partial view, on an enlarged scale, of the upper right hand corner of the installed window of FIG. 1, illustrating shortcomings therein;

FIG. 3 is a view of the inventive moulding hereof similar to FIG. 2 and intended by comparison to illustrate the differences between this moulding and the prior art moulding of FIG. 2;

FIGS. 4 and 5 are partial sectional views, the former taken along line 4—4 of FIG. 1., illustrating, in sequence, the installation of the prior art moulding;

FIG. 6. is a cross sectional isolated view of the prior art moulding being installed in the method steps of FIGS. 4 and 5;

FIG. 7 is a further view similar to FIGS. 4 and 5, but illustrating a shortcoming of the installed prior art moulding;

FIG. 8, like FIG. 1, is a perspective view of an auto rear view window, in which the window is installed using the improved moulding hereof; and FIG. 9 is an enlarged scale sectional view, taken along lines 9—9 of FIG. 8, illustrating structural features of, and the installed condition of, the within inventive window moulding.

During the installation of a vehicle window, be it in the factory or in the repair shop, the installation is completed by applying a combination weather seal and decorative trim strip 10 as shown in FIG. 1, commonly referred to as a reveal moulding.

One form of a prior art strip 10 in popular use is shown in FIGS. 1,2, and 5–7, now to be described. The body panel 12 of the vehicle 14 is shaped to receive the window pane 16. Within the formed body panel 12 and as best shown in FIG. 4, is typically a flange wall 20 and a flange 22. On the inside face of a window pane 16, a preassembled seal member 24 to the glass 16 is adapted to rest on flange 22 and act as a cushion between the glass 16 and flange 22 about the periphery of the window opening. The space left between the edge 18 of the glass 16 and the wall 20 is aptly defined as a gap 26 into which it is contemplated that an adhesive 28 be applied after the glass 16 is in place. Seal member 24 also serves to contain or confine adhesive 28 within the gap 26. The glass installation is completed by inserting a trim strip 10 within gap 26 and into the uncured adhesive 28.

In FIG. 6, a popularly used trim strip 10 is illustrated in section and includes a crown member 30 having a center depending stem or wall 32 at whose base is an arrow shaped tip or barb 34. On each side of wall 32 are two or more retrorse fin-like members 36, in symmetrical relation about centerline 38. Since strip 10 is typically an extrusion molded from appropriate elastomeric or plastic construction material, it exhibits some flexibility with known characteristic limitations in tension and compression.

When strip 10 is pushed into gap 26, barb member 34 is buried deeply in adhesive 28 along with one or two tiers of fin members 36. Members 36 also flex and tend to center the wall 32 within the gap 26, and likewise also position the crown 30 with equal overhangs relative to the centerline 38 upon the outside face 40 of glass 16 and on body panel 12, thereby effectively creating a weathertight seal for the gap 26. Upon curing of the adhesive 28, the assembly of body panel 12, glass pane 16 and strip 10 develop into a firmly bonded combination.

Referring to FIGS. 1 and 2, and in particular to the upper right corner of window pane 16, note should be made of corner radius R. In practice it has been found that when radius R is "large", a good seal is obtained when strip 10 is used. However, when radius R is of a nominal extent, as occurs in a small radius turn, the imposed geometry is one in which the inner edge of crown 30 on strip 10 lifts away from glass surface 40, as at 42 (see FIG. 7) due to compression. The "inside" members 36 also exhibit an undulating geometry or crimping within the curved section of strip 10. This undesirable crumpling or crimping is believed due to an excessive tension T in the outer edges of the crown and fin members of strip 10, while the inner edges of these structural members yield to compression C forces, as shown schematically in FIG. 2, and also as noted in FIG. 3 of the Yamada et.al. patent.

In accordance with current practice, it is undoubtedly because of this crimping that when the auto design specifies small radius corners for the rear window (and possibly also the windshield), that use is made of separate molded corner pieces 44, as shown in FIG. 1, at the lower corners of the window 16. This technique to avoid the problem however, obviously increases parts and handling costs.

Even without dispensing with corner pieces 44 it is desirable to be able to use a seal strip having good seal integrity, which could be applied as one continuous piece to window 16 as shown in FIGS. 8 and 9, and also fit, without crimping, in minimum radius R corners. Such a strip is the inventive strip 10 hereof, which is finished at 46 by a cemented butt joint or other conventional means, and does not require separate corner pieces.

For purposes of orientation, as seen in FIG. 9, the left side of wall 48 will be called the "glass side" 54, that is, the side that faces the edge 18 of glass 16, and the right side of wall 50 will be called the "chassis side" 56, that is, the side that faces wall 20 of vehicle 14.

In a manner similar to members 36 of strip 10, fin-like members 58 on the chassis side of strip 50 of strip 10 are compressed and bear against wall 20. This action forces wall 50 towards glass 16 where vertically spaced nub-like members 60 on the glass side 52 of wall 48 bear against the edge 18 of glass 16. Crown 48 of strip 10′ is automatically positioned in covering relation over gap 26 as was crown 30 in the prior art. Adhesive 28, within the gap 26, cooperates with glass 16, seal member 24, flange 22, wall 20 and seal strip 10′ as it did with strip 10 of the prior art. It is to be noted however, and in particular as shown in FIG. 3, to which figure reference should now be made, that as seal strip 10′ rounds a corner R, the "inside" portion of crown 48 is under much less compression than was its prior art counterpart of crown 30 on strip 10. Correspondingly, the "outside" portion of crown 48, which is under tension, stretches to a larger extent than that of the prior art of crown 30 on strip 10.

Because of the location of wall 50 in relation to the inverted "c" shaped crown 48 of strip 10′ there is a tendency for the inner lip and the outer lip to bend or to be under an urgency toward the respective seal surfaces 40 and 12, rather than for the inner lip to lift away therefrom, as was the case when the radius R gets smaller. It has been found that the FIG. 9 configuration of strip 10′ results in favorable balancing of the tension and compression forces within the crown 48 as the radius R through which it must extend or be fitted into, becomes smaller. This has the effect of eliminating the crumpling or crimping on the inner side of the strip crown 40.

In summary, because in accordance with the present invention, the overhang of crown 48 on the glass side 50 is less then it would be following prior art practice (since prior art practice requires symmetry and thus an overhang size equal to that of the overhang on the Chassis side 56) the diminished glass side crown overhang 50 does not exhibit any crimping when projected into the gap 26 of a small radius corner turn. Underlying the present invention, at least in part, is the recognition that the glass is the component having the constant size and that, therefore, the overhang of the moulding adjacent the glass can be reduced in size and yet, have its necessary overlapping relation with respect to the edge of the glass. If there is excessive size in the gap 26, it will occur on the chassis side 56, but since this moulding side is placed under tension during a small radius turn, the englarging of the crown overhang to anctipate this problem is of no adverse consequence as far as the appearance of the moulding is concerned.

The construction material selected for the strip 10′ and the width size of the gap 26 in which it is to be fitted will, of course, dictate the appropriate sizes of the crown overhang 48 for providing non-crimped appearance for specific small radius turns (the size of the opposite crown overhang being non-consequential); it being suffice for a complete understanding of the present invention to recognize that the strip should not be centered in the gap, but that it should be shifted adjacent the glass and that consequently the glass overhang of the crown can advantageously be of a nominal extent which does not exhibit crumpling or crimping.

While the particular FIG. 9 auto window moulding and installation method herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. In a motor vehicle body, an improved moulding for concealing the space between a body panel flange and the edge of a window panel mounted on the body panel flange by a curable adhesive of the type wherein said moulding has a decorative trim portion adapted to bridge the space between the window panel and the body panel in overlying engagement therewith, and has a resiliently yieldable stem extruded integral with the decorative trim portion extending generally normal therefrom for insertion into the space between the window panel and body panel, said improvements in said moulding comprising said stem being in an off-center location on said decorative trim portion so as to be closer to said edge of said window panel, and said width of said decorative trim portion in spanning relation from said stem to said edge of said window panel being of a lesser extent then the width of said decorative trim portion in spanning relation from said stem to said body panel flange, whereby said moulding is bendable through comparatively small angles without manifesting any crimping in the edges of the desorative trim portion thereof.

* * * * *